United States Patent
Chan et al.

(10) Patent No.: US 8,985,512 B1
(45) Date of Patent: Mar. 24, 2015

(54) AIRCRAFT, FUSELAGES, AND ASSOCIATED METHODS

(71) Applicant: The Boeing Company, Seal Beach, CA (US)

(72) Inventors: Wallace C. H. Chan, Bothell, WA (US); Bernhard Dopker, Bellevue, WA (US)

(73) Assignee: The Boeing Company, Chicago, IL (US)

(*) Notice: Subject to any disclaimer, the term of this patent is extended or adjusted under 35 U.S.C. 154(b) by 179 days.

(21) Appl. No.: 13/624,786

(22) Filed: Sep. 21, 2012

(51) Int. Cl.
*B64C 1/06* (2006.01)
*B64C 1/12* (2006.01)
*B64C 1/14* (2006.01)

(52) U.S. Cl.
CPC .............. *B64C 1/061* (2013.01); *B64C 1/064* (2013.01); *B64C 1/068* (2013.01); *B64C 1/12* (2013.01); *B64C 1/1407* (2013.01); *B64C 1/1484* (2013.01)
USPC ........................................................ 244/120

(58) Field of Classification Search
USPC ............... 244/119, 120, 123.1, 123.12, 123.5
See application file for complete search history.

(56) References Cited

U.S. PATENT DOCUMENTS

| | | | |
|---|---|---|---|
| 3,029,910 A * | 4/1962 | Kirk et al. | 428/593 |
| 3,910,531 A | 10/1975 | Leomand | |
| 4,416,349 A * | 11/1983 | Jacobs | 181/208 |
| 7,025,305 B2 | 4/2006 | Folksson et al. | |
| 2008/0105785 A1 | 5/2008 | Griess et al. | |
| 2008/0111024 A1* | 5/2008 | Lee et al. | 244/121 |
| 2009/0121081 A1* | 5/2009 | Karem | 244/119 |
| 2010/0006702 A1 | 1/2010 | Fogarty et al. | |
| 2010/0025532 A1 | 2/2010 | Herrmann et al. | |
| 2010/0200697 A1 | 8/2010 | Sankrithi et al. | |

* cited by examiner

*Primary Examiner* — Philip J Bonzell
*Assistant Examiner* — Nicholas McFall
(74) *Attorney, Agent, or Firm* — DASCENZO Intellectual Property Law, P.C.

(57) ABSTRACT

Fuselages according to the present disclosure include a structural frame and a skin operatively coupled to the structural frame. In some embodiments, the skin includes a plurality of core sections that extend circumferentially around the fuselage and that are spaced-apart longitudinally along the fuselage. In some embodiments, the inner side of the skin generally undulates longitudinally along the fuselage. Methods of constructing fuselages also are disclosed.

16 Claims, 6 Drawing Sheets

AIRCRAFT, FUSELAGES, AND ASSOCIATED METHODS

FIELD

The present disclosure relates to aircraft fuselages.

BACKGROUND

Figure 1:
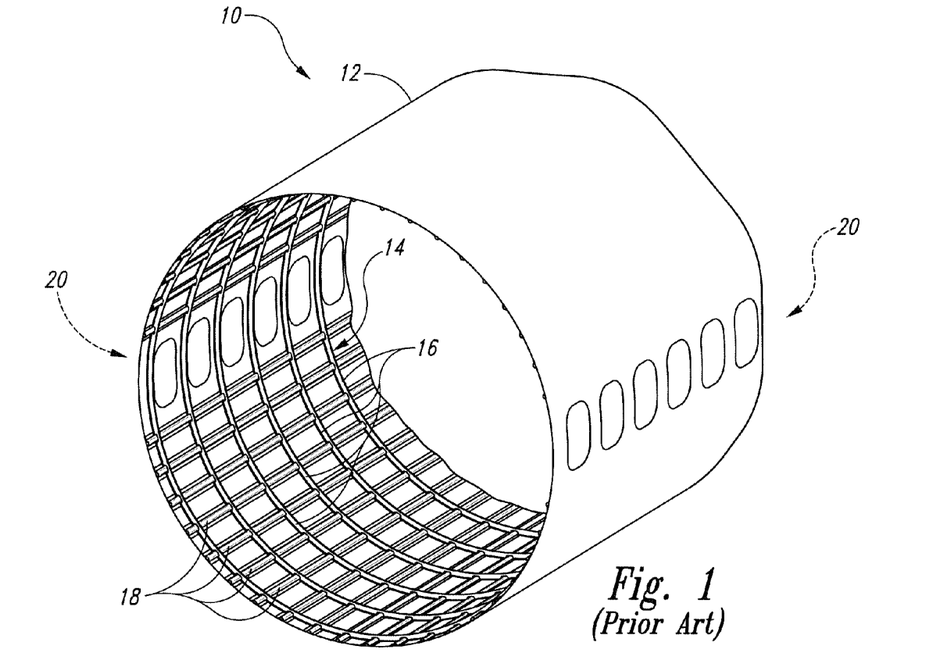
FIG. 1 is a fragmentary isometric view of a portion of a prior art fuselage.

With reference to FIG. 1, a fuselage 10 of a typical, modern prior art commercial aircraft includes a skin 12 that is wrapped around a structural frame 14. The structural frame 14 of a typical, modern prior art commercial aircraft includes a series of frame members, or frames, 16 that extend circumferentially around the inside of the skin 12. Prior art fuselages 10 also include a series of stringers 18 that extend longitudinally along the inside of the skin 12. Depending on the size of aircraft, the fuselage 10 may include more than 20, more than 50, more than 75, or even more than 100 stringers 18 that are spaced apart circumferentially around the inside of the skin 12. Some fuselages 10 may include window regions 20 defined by pairs of stringers 18 that may be spaced further apart than other adjacent pairs of stringers 18. Typically, at least one stringer 18 is positioned about every 3-18 degrees around the circumference of a fuselage 10. Typical spacing of stringers may be in the 100-300 millimeter range.

The skins 12 of prior art fuselages 10 typically are constructed of a single wall, or sheet, of material that is fastened to the structural frame 14. Historically, aluminum has been used to construct skins 12 and stringers 18, but more recently, skins 12 are being constructed of carbon fiber reinforced plastics that are formed into a single wall, or sheet, of material that wraps around structural frames 14. Similarly, aluminum historically was used to construct structural frames 14, but now carbon fiber reinforced plastics are being used to construct structural frames 14, as well.

SUMMARY

Aircraft, fuselages, and methods of constructing fuselages and aircraft are disclosed herein. In some embodiments, a fuselage includes a skin having an outer face-sheet, an inner face-sheet, and a plurality of core sections positioned between the outer face-sheet and the inner face-sheet, and a structural frame operatively coupled to the inner side of the skin. The outer face-sheet and the inner face-sheet collectively define a plurality of cavities spaced longitudinally along the fuselage, and the core sections are positioned within each cavity of the plurality of cavities. In some embodiments, the inner side of the skin generally undulates longitudinally along the fuselage.

DESCRIPTION

Figure 2:
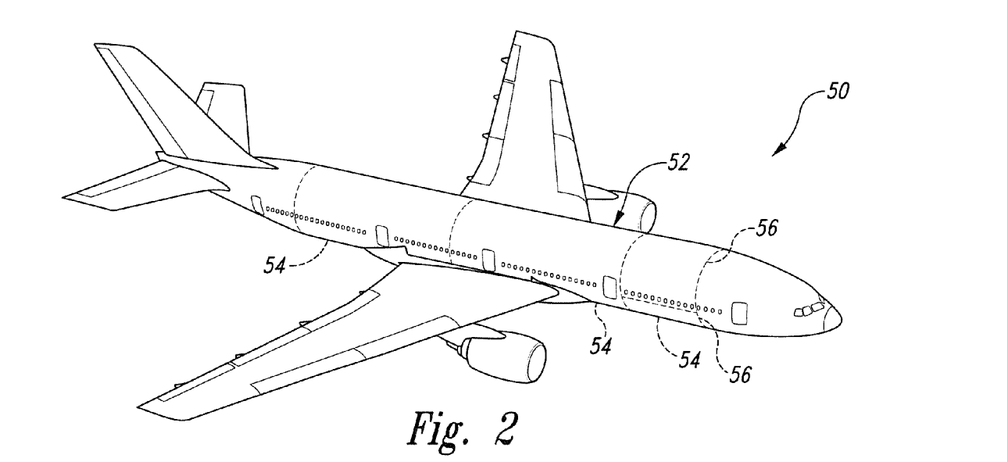
FIG. 2 is an isometric view of an aircraft according to the present disclosure.

Aircraft, fuselages of aircraft, and methods of constructing fuselages and aircraft are disclosed herein. In FIG. 2, an example of an aircraft 50 according to the present disclosure is generically and generally schematically illustrated. Aircraft 50 according to the present disclosure may take any suitable form, including commercial aircraft, military aircraft, private aircraft, or any other suitable aircraft. While FIG. 2 illustrates aircraft 50 in the form of a fixed wing aircraft, other types and configurations of aircraft are within the scope of aircraft 10 according to the present disclosure, including (but not limited to) helicopters. An aircraft 50 includes a fuselage 52, which generally corresponds to the main body of the aircraft 50 for holding passengers, crew, cargo, and/or equipment, for example, depending on the particular configuration and/or function of an aircraft 50. Typically, although not required, the fuselage 52 of an aircraft 50 is elongate and somewhat cylindrical. In some embodiments, the fuselage 52 may be constructed of multiple sections 54 that are longitudinally spaced along the fuselage 52 and operatively coupled together to define the fuselage 52. As used herein when referencing an aircraft 50 and/or a fuselage 52, the longitudinal direction refers to the fore-aft direction and corresponding to a longitudinal, or long, axis of the fuselage 52. In FIG. 2, three fuselage sections 54 are indicated schematically; however, any number or size and shape of sections 54 may be used to construct a fuselage 52. Sections 54 additionally or alternatively may be referred to as barrel sections 54 of a fuselage 52, with each barrel section 54 generally defining a length of fuselage 52. Additionally or alternatively, as schematically illustrated in FIG. 2, a section 54 may include, or be constructed of, more than one subsection 56. In the schematically illustrated and optional example of FIG. 2, a section 54 is shown schematically and optionally to include an upper subsection 56 and a lower subsection 56; however, a section 54 may be constructed of any suitable number, configuration, and placement of subsections 56, including no subsections 56 at all.

Figure 3:
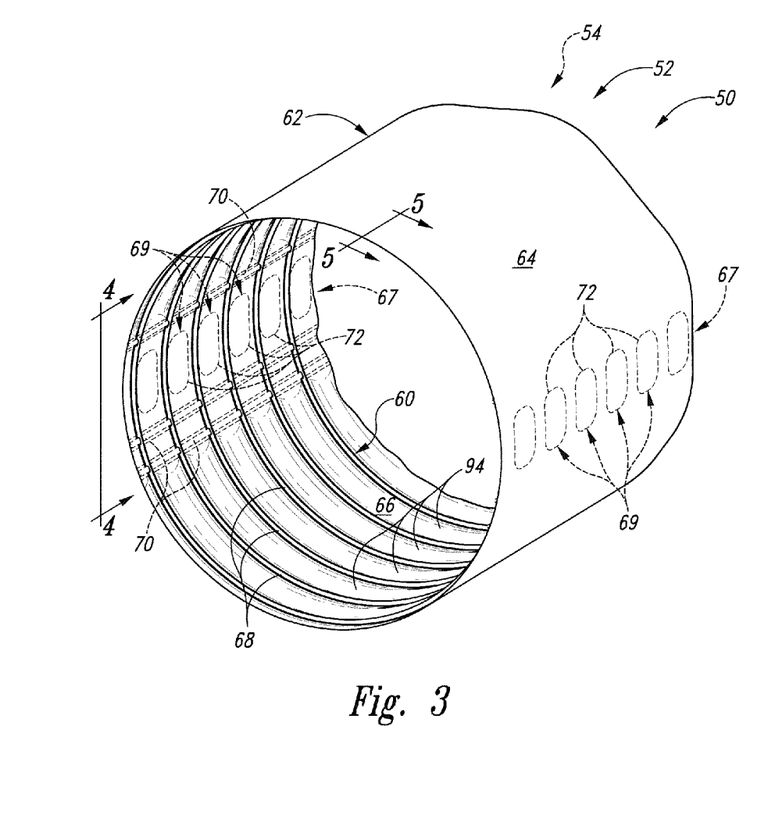
FIG. 3 is a fragmentary isometric view of a portion of a fuselage according to the present disclosure.

FIG. 3 depicts a portion of an illustrative, non-exclusive example of a fuselage 52 according to the present disclosure. Fuselages 52 according to the present disclosure include a structural frame 60 and a skin 62 that is operatively coupled to the structural frame 60. The skin 62 may be described as defining the outer shape of the fuselage 52 and may be described as having an, outer side 64 and an inner side 66. As used herein, the terms, 'inner' and 'outer' are associated with the inside and the outside of the fuselage 52. Accordingly, the outer side 64 generally faces away from the fuselage 52, and the inner side 66 generally faces the internal volume that is defined by the fuselage 52.

As seen in FIG. 3, the structural frame 60 of a fuselage 52 includes a plurality of frame members, or frames, 68 that are operatively coupled to and that extend circumferentially around the inner side 66 of the skin 62 and that are spaced longitudinally along the fuselage 52. In some embodiments of fuselages 52, the structural frame 60 may not include any stringers that extend longitudinally along the inner side 66 of the skin 62. However, some fuselages 52 do include one or more stringers 70 that extend longitudinally along the inner side 66 of the skin 62. For example, one or more stringers 70 may be utilized in regions 67 of a fuselage 52 in which the skin 62 is penetrated, or otherwise has or defines a void 69, for example, in which some form of structure penetrates through the skin 62. Illustrative, non-exclusive examples of such voids 69 include (but are not limited to) voids 69 for windows, doors, drain holes, valves, antennae, etc. In such regions 67 of a fuselage 52, stringers 70 may be utilized to strengthen and stiffen the fuselage 52. In FIG. 3, examples of voids 69 are illustrated in the form of windows 70.

Figure 4:
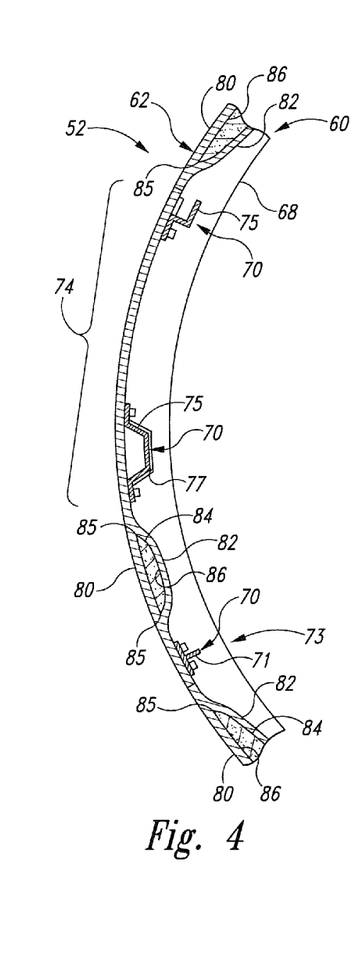
FIG. 4 is a fragmentary cross-sectional view of a portion of a fuselage according to the present disclosure, generally corresponding to line 4-4 in FIG. 3, illustrating three optional stringers.

In FIG. 3, three optional stringers 70 are illustrated in dashed lines, representing illustrative, non-exclusive examples of stringer configurations that may be incorporated into a fuselage 52 according to the present disclosure. FIG. 4 illustrates the corresponding portion of a lateral side of a fuselage 52 that includes stringers 70. A corresponding opposite lateral side of a fuselage 52 also may include such stringers 70. In the illustrated example, the fuselage 52 includes two stringers 70 that collectively define a floor interface 73 of the fuselage 52, with the illustrated stringer 70 defining the floor interface indicated at 71. That is, two stringers 71 may extend longitudinally along the inner side 66 of the skin 62 and be provided for operative placement and mounting of a floor within the internal volume of the fuselage 52. Additionally or alternatively, in embodiments of fuselages 52 that include optional windows 72, a pair of stringers 70, as illustrated in FIG. 4, may define, or bound, a window region, or belt, 74 on each lateral side of a fuselage 52, with these optional stringers indicated as stringers 75 in FIG. 4. In embodiments of aircraft 50 that include both of an internal floor and windows 72, six stringers 70 may be provided to collectively define a floor and window region, or belt, 76 on each lateral side of the fuselage 52. Other configurations of stringers also are within the scope of the present disclosure, including stringers 70 that bound, or otherwise define, regions 67 of fuselages 52 having voids 69 other than windows 70.

In some embodiments, a fuselage 52 may include fewer than 10, 9, 8, 7, 6, 5, 4, 3, or 2 stringers. In some embodiments, a fuselage 52 may include exactly two stringers 70 that collectively define a floor interface such as, for example, fuselages 52 that do not include windows, or least do not include windows extending longitudinally along a substantial length of the fuselage 52. Some embodiments of fuselages 52 may include exactly six stringers 70, with two pairs of stringers 70 on each lateral side defining a window region 74 and with one stringer 70 on each lateral side collectively defining a floor interface 73. In some embodiments, one or more circumferential spans of at least 10, 20, 30, 40, 50, 60, 70, 80, 90, or 95% of the fuselage 52 may be free of stringers. Stated differently, in some embodiments, there may be circumferential spans of the fuselage 52 that do not include any stringers and that account for significant portions of the fuselage 52. For example, in the illustrated example of a fuselage 52 in FIG. 3 with the optional stringers 70 defining both a window region 74 and a floor interface 73 on the lateral sides of the fuselage 52, the fuselage 52 has two circumferential spans without any stringers 70 that account for at least 25% of the full circumferential span of the fuselage 52.

The frame members 68 and the optional stringers 70 may be constructed of any suitable material. For example, one or more of the frame members 68 and one or more of the optional stringers 70 may be constructed of fiber reinforced composite material. As used herein, a fiber reinforced composite material should be understood to include at least an epoxy or other polymer or binding material together with fibers, such as (but not limited to) carbon fibers, boron fibers, para-aramid (e.g., Kevlar®) fibers, and/or other fibers. Fiber reinforced composite materials additionally or alternatively may be described as or referred to as fiber reinforced polymers, or plastics. Additionally or alternatively, one or more of the frame members 68 and one or more of the optional stringers 70 may be constructed of a metallic material, such as (but not limited to) aluminum or titanium alloys. In some embodiments of fuselages 52 that include one or more optional stringers 70, it may be desirable for one or more stringers 70 to be electrically conductive, so as to enable electrical conductivity of the fuselage 52 in the fore-aft direction of the fuselage 52.

In FIG. 4, three optional configurations of stringers 70 are illustrated, with these configurations being illustrative and non-exclusive. The illustrated stringer 71 defining the optional floor interface 73 may be described as a T-shaped stringer 70. The illustrated stringers 75 defining the optional window region 74 include a hat-shaped stringer 70 and a Z-shaped stringer 70. In some embodiments, such as illustrated in connection with the hat-shaped stringer 70, a stringer 70 may have a uniform cross-section along its entire, or at least substantially along its entire, length, with the stringer 70 extending through passages 77 defined by the frame members 68 and the skin 62. These optional passages 77 additionally or alternatively may be described as or referred to as mouseholes 77 or as stringer mouseholes 77. In some embodiments, such as illustrated in connection with the Z-shaped stringers 70 in FIG. 4, a stringer 70 may not have a uniform cross-section along its entire length, with the stringer 70 changing in cross-sectional profile at the interface with a frame member 68. The particular configuration of an optional stringer 70 may depend at least in part on one or more of the material from which it is constructed, the material from which frame members 68 are constructed, and/or the desired functionality of a stringer 70. Stingers 70 according to the present disclosure may take any suitable form and configuration depending, and the present disclosure is not limited to the illustrated examples. For example, stringers 70 having an I, J, angled, and reverse hat configurations also are within the scope of the present disclosure.

Figure 5:
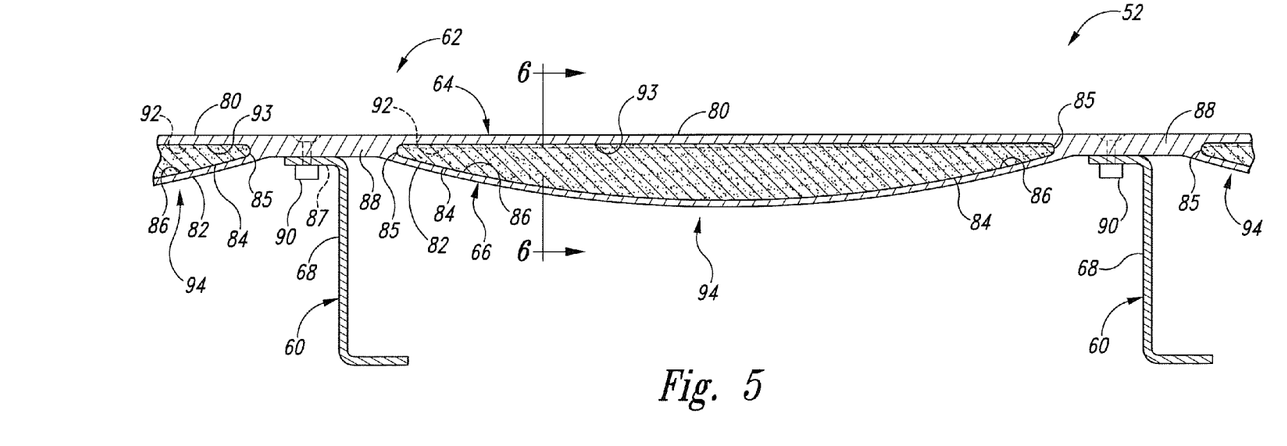
FIG. 5 is a fragmentary cross-sectional view of a portion of a fuselage according to the present disclosure, generally corresponding to the line 5-5 in FIG. 3.

Turning now to FIG. 5, which illustrates a longitudinal cross-section of a portion of a fuselage 52, skins 62 according to the present disclosure may include an outer face-sheet 80 that defines the outer side 64 of the skin 62, an inner face-sheet 82 that defines the inner side 66 of the skin 62, and a plurality of core sections 84 that are positioned between the outer face-sheet 80 and the inner face-sheet 82. In such embodiments, the outer face-sheet 80 and the inner face-sheet 82 collectively may define a plurality of cavities 86 that are spaced longitudinally along the fuselage and with a core section 84 positioned within each cavity 86. In some embodiments, the core sections 84 predominantly, or even completely, fill the cavities 86. The cavities 86 define end regions 85 where the outer face-sheet 80 and the inner face-sheet 82 come together. These end regions may take any suitable form, depending on the process in which the skin 62 is constructed and/or depending on desired structural characteristics of the cavities. The illustrated end regions 85 in the Figures are not limiting. As illustrative, non-exclusive examples, the end regions 85 illustrated in FIG. 4 are generally sharp, or generally define a linear interface, the end regions 85 illustrated in FIG. 5 are generally rounded, and the end regions 85 illustrated in FIGS. 7-10 are generally flat, or planar.

The cavities 86, when present, extend circumferentially and at least partially around the fuselage 52. In embodiments of fuselages that do not include a region 67 having one or more voids 69, such as a window region 74 and/or a window and floor region 76, the cavities 86 may extend completely around the fuselage 52. Additionally or alternatively, within regions of a fuselage 52 that do not include one or more voids 69, the cavity or cavities 86 within such region may extend completely around the fuselage 52. Additionally or alternatively, one or more of all cavities 86 of a fuselage 52 may extend completely around the fuselage 52 other than within one or more regions 67 having one or more voids 69. Similarly, one or more of all of the core sections 84 may extend completely around the fuselage 52 other than within one or more regions 67 having voids 69.

As seen in FIG. 5, and with reference to FIG. 3 as well, in some embodiments, each cavity 86 may be described as being positioned between adjacent frame members 68. Additionally or alternatively, the outer face-sheet 80 and the inner face-sheet 82 may be described as being joined together between adjacent cavities 86 to define partitions 88 that extend circumferentially around the fuselage 52, and in some embodiments, completely around the fuselage 52. In such embodiments, the frame members 68, or at least a subset of the frame members 68 of a structural frame 60, may be operatively coupled to the partitions 88. Additionally or alternatively, the outer face-sheet 80 and the inner face-sheet 82 may be joined together within an optional region 67 of a fuselage 52, such as an optional window and/or floor region 74, 76, such as understood with reference to FIG. 4.

As perhaps best seen in FIG. 5, in some embodiments, the cavities 84 may not define any hard edges and/or flat surfaces. Similarly, the inner side 66 may not define any hard edges and/or flat surfaces. Moreover, the outer face-sheet 80 and the inner face-sheet 82 may have differing natural frequencies. As a result, a skin 62 according to the present disclosure may significantly reduce the penetration of noise into the internal volume of the fuselage 52 when compared to prior art fuselages. That is, such configurations of skins 62 according to the present disclosure may have a noise dampening effect when compared to prior art fuselages.

In some embodiments, the lack of mouseholes 77 in the frame members 68 may permit for the outer chord 87 of a frame member 68 to be a failsafe chord. As a result, the overall height of the frame members 68 may be reduced compared to prior art fuselages that do include mouseholes 77. As a result, in some embodiments of fuselages 52, the frame members 68 may have heights that are 10-20% less and/or 0-50 millimeters, such as 5-20 millimeters, less than comparable frame members of a prior art fuselage that includes mouseholes 77. Accordingly, the overall outer cross-sectional area of a fuselage 52 may be significantly reduced while maintaining the same internal cabin volume as a prior art fuselage. This decrease in overall size of a fuselage results in a lighter fuselage and/or an aircraft that has a larger capacity or payload, an aircraft that has a reduced aerodynamic drag, an aircraft that has increased fuel efficiency, etc. when compared to a prior art fuselage.

The outer face-sheet 80 and the inner face-sheet 82 may be constructed of any suitable material. As an illustrative, non-exclusive example, the outer face-sheet 80 and the inner face-sheet 82 may be constructed of fiber reinforced composite material. In such embodiments, the outer face-sheet 80 and the inner face-sheet 82 may be constructed as a unitary structure. By unitary structure, it is meant that when constructed, the outer face-sheet 80 and the inner face-sheet 82 are joined together, such as at a partition 88, without a distinct interface between the two structures where joined together. This can be seen in the illustrative, non-exclusive example of FIG. 5, in which the outer face-sheet 80 and the inner face-sheet 82 come together at the partition 88. Stated differently, the outer-face sheet 80 and the inner face-sheet 82 may be co-cured, at least within the regions, such as partitions 88, where the outer face-sheet 80 and the inner face-sheet 82 are joined together. Additionally or alternatively, while separately described as face-sheets, in some embodiments, for example when the skin 62 is constructed of fiber reinforced composite material, the outer face-sheet 80 and inner face-sheet 82 of the skin 62 may form a unitary structure, at least within a section, such as a barrel section 54 or a subsection 56, of a fuselage 52. Additionally or alternatively, it is within the scope of the present disclosure that the outer face-sheet 80 and the inner face-sheet 82 may be fastened together by fasteners and/or may be welded together to define the partitions 88. Embodiments that include one or both of the outer face-sheet 80 and the inner face-sheet 82 constructed of a metallic material may utilize fasteners and/or welds to join the outer face-sheet 80 and the inner face-sheet 82. Other configurations also are within the scope of the present disclosure.

In embodiments in which at least the one or more frame members 68 are constructed of fiber reinforced composite material and at least the inner face-sheet 82 also is constructed of fiber reinforced composite material, the frame members 68 may be (but are not required to be) constructed as a unitary structure together with the inner face-sheet 82. That is, the frame members 68 may be co-cured with the inner face-sheet 82, so that no separate fasteners are required to secure the frame members 68 to the skin 62. In embodiments in which the outer face-sheet 80 also is constructed of fiber reinforced composite material, the frame members 68 may be co-cured together with both of the inner face-sheet 82 and the outer face-sheet 80 to form a unitary structure. However, as illustrated in FIG. 4, it is within the scope of the present disclosure that fasteners 90 may be used to operatively couple the frame members 68 to the skin 62.

The core sections 84 may be constructed of any suitable material. As an illustrative, non-exclusive example, the core sections 84 may be constructed of a foam material, such as a rigid closed-cell foam. The core sections 84 may be lightweight and/or have a low density. Additionally or alternatively, the core sections 84 may be constructed of a material that is strong enough to withstand significant pressure imparted during the forming and curing of the inner face-sheet 82 over the core sections 84. This pressure may be referred to as a curing pressure and may be in the range of 10-1000 psi, including (but not limited to) in the range of 10-100 psi, at least 50 psi, at least 100 psi, etc. Additionally or alternatively, the core sections 84 may be constructed of a flame resistant material, of a material that includes a flame retardant, of a smoke resistant material, and/or of a material with a low toxicity. Additionally or alternatively, the core sections 84 may be constructed of a material that ensures that the skin 62 meets United States Federal Aviation Administration requirements. An illustrative, non-exclusive example of a suitable material for the construction of the core sections 84 is the ROHACELL® 71 XT™ material from Evonik Industries AG, which is a closed-cell rigid foam based on polymethacrylimide chemistry and having a density of approximately 75 kg/m³.

Additionally or alternatively, core sections 84 may vary in size (including width, height, etc.), shape (including curvature, etc.), density, and/or material depending on the location of the core sections 84 within the fuselage 52, depending on the desired properties of the core sections 84, depending on a particular load within a region of the fuselage 52, depending on the curing pressure within a region of the fuselage 52, etc.

Figure 6:
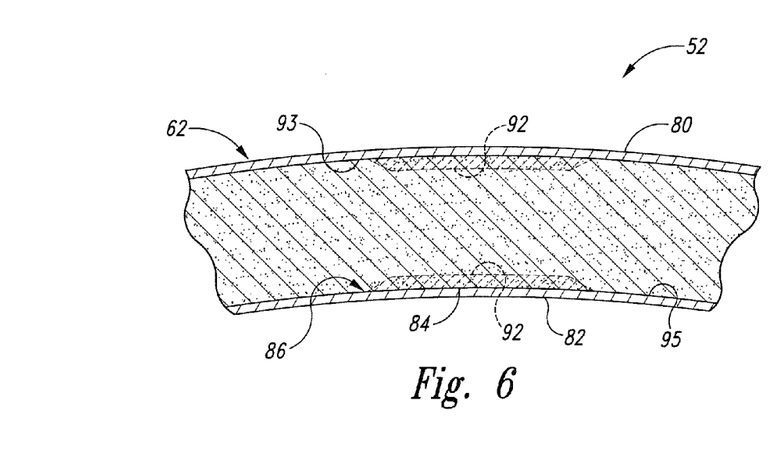
FIG. 6 is a fragmentary cross-sectional view of a portion of a fuselage according to the present disclosure, generally corresponding to the line 6-6 in FIG. 5.

As optionally illustrated in dashed lines in FIGS. 4 and 6, the outer face-sheet 80 may include thickened, or reinforced, regions 92 that extend longitudinally along the inner side 93 of the outer face-sheet 80. Thickened regions 92 additionally or alternatively may be described as or referred to as planks 92. When present, the thickened regions 92 may be spaced circumferentially around the fuselage 52. Additionally or alternatively, as also optionally illustrated in dashed lines in FIG. 6, optional thickened regions 92 may extend longitudinally along the outer side 95 of the inner face-sheet 82.

Any suitable size and number of thickened regions 92 may be incorporated into an outer face-sheet 80 and/or an inner face-sheet 82, for example, depending on the size of the fuselage 52, the structural requirements of the fuselage 52, etc. As illustrative, non-exclusive examples, an outer face-sheet 80 and/or an inner face-sheet 82 may include at least 10, 20, 30, 50, 75, or 100 thickened regions 92 spaced circumferentially around the fuselage 52. Additionally or alternatively, an outer face-sheet 80 and/or an inner face-sheet 82 may include fewer than 10, 20, 30, 50, 75, or 100 thickened regions 92 spaced circumferentially around the fuselage 52. In some embodiments, at least a subset of the total number of thickened regions 92 may be approximately evenly spaced at least every 30, 25, 20, 15, 10, 5, or 3 degrees circumferentially around the fuselage. In some embodiments, the thickened regions 92 may be less than about 20, 30, 40, 50, 60, 70, 80, 90, or 100 millimeters wide and/or greater than about 20, 30, 40, 50, 60, 70, 80, 90, or 100 millimeters wide. In some embodiments, the thickened regions 92 may be less than about 0.5, 1, 1.5, 2, 5, or 10 millimeters thicker than adjacent regions of the respective outer face-sheet 80 or inner face-sheet 82 and/or may be greater than about 0.5, 1, 1.5, 2, 5, or 10 millimeters thicker than adjacent regions of the respective outer face-sheet 80 or inner face-sheet 82. Other configurations of thickened regions 92 also are within the scope of the present disclosure.

In embodiments in which the outer face-sheet 80 is constructed of fiber reinforced composite material, optional thickened regions 92 may include more plies of fiber reinforced composite material than adjacent regions of the outer face-sheet 80. For example, thickened regions 92 may include 1-100, including 2-3, more plies of fiber reinforced composite material than adjacent regions of the outer face-sheet 80. Additionally or alternatively, the thickened regions 92 may include greater than or less than 10 more plies of fiber reinforced composite material than adjacent regions of the outer face-sheet 80. Similarly, in embodiments in which the inner face-sheet 82 is constructed of fiber reinforced composite material, optional thickened regions 92 may include more plies of fiber reinforced composite material than adjacent regions of the inner face-sheet 82. For example, thickened regions 92 may include 1-100, including 2-3, more plies of fiber reinforced composite material than adjacent regions of the inner face-sheet 82. Additionally or alternatively, the thickened regions 92 may include greater than or less than 10 more plies of fiber reinforced composite material than adjacent regions of the inner face-sheet 82. Other configurations also are within the scope of the present disclosure, and there is no requirement that all of the thickened regions 92 be identically configured. That is, the optional thickened regions 92 may include varying sizes and configurations.

Referring back to FIG. 3, illustrative, non-exclusive examples of fuselages 52 may be described as having a skin 62 with an inner side 66 that generally undulates longitudinally along the fuselage 52. In some embodiments, the inner side 66 of the skin 62 may regularly undulate longitudinally along the fuselage 52. In some such embodiments, the skin 62 may include core sections 84 that are generally uniform in size and shape and that are spaced longitudinally along the fuselage 52. In other embodiments, the skin 62 may include core sections 84 that are not generally uniform in size and shape, but that are spaced longitudinally along the fuselage 52. Additionally or alternatively, the inner side 66 of a skin 62 of a fuselage 52 may be described as including or defining convex regions 94 that extend radially inward of the fuselage 52 and at least partially circumferentially around the fuselage 52. In such embodiments, the core sections 84 may be described as being within the convex regions 94. In some embodiments, the convex regions 94 may be regularly spaced longitudinally along the fuselage 52. In some embodiments, the frame members 68 may be operatively coupled to the skin 62 between the convex regions 94. Additionally or alternatively, the inner side 66 of a skin 62 of a fuselage 52 may be described as including or defining hyperbolic surfaces that bulge radially inward of the fuselage 52 and at least partially circumferentially extend around the fuselage 52. In some embodiments, the frame members 68 may be operatively coupled to the skin 62 between the hyperbolic surfaces.

As mentioned, a fuselage 52 according to the present disclosure may be constructed of a plurality of barrel sections 54 that are longitudinally and operatively coupled together at a splice, or joint, 96. Within each barrel section 54, the outer face-sheet 80 and the inner face-sheet 82 may be constructed as a unitary structure, as discussed herein. Additionally or alternatively, a barrel section 54, itself, may be constructed of more than one subsection 56, in which embodiments, the outer face-sheet 80 and the inner face-sheet 82 may be constructed as a unitary structure within the subsections 56.

Figure 7:
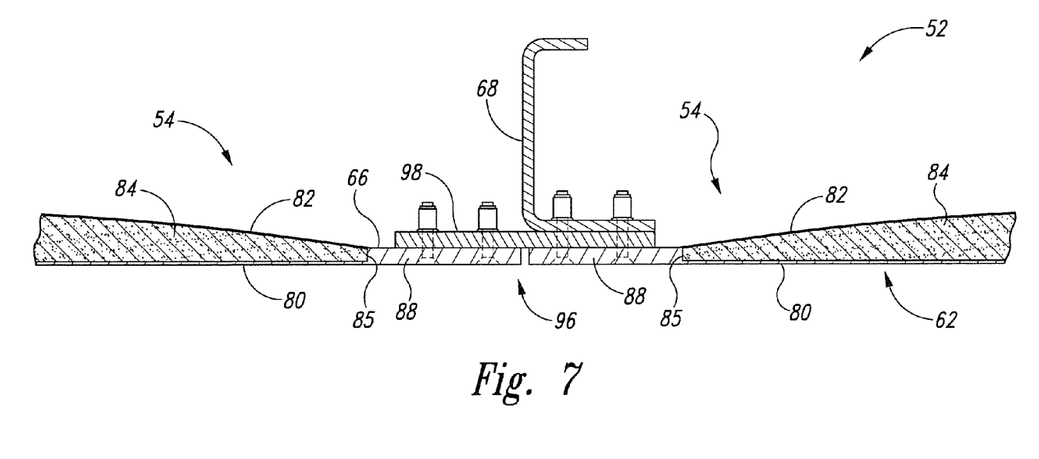
FIG. 7 is a fragmentary cross-sectional view of a portion of a fuselage according to the present disclosure, illustrating an example of a joint between two fuselage sections.
Figure 8:
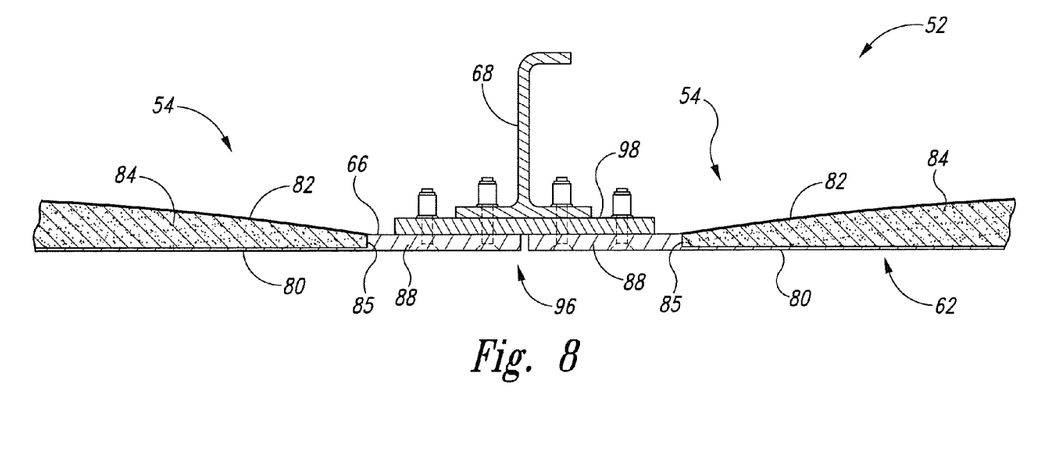
FIG. 8 is a fragmentary cross-sectional view of a portion of a fuselage according to the present disclosure, illustrating another example of a joint between two fuselage sections.
Figure 9:
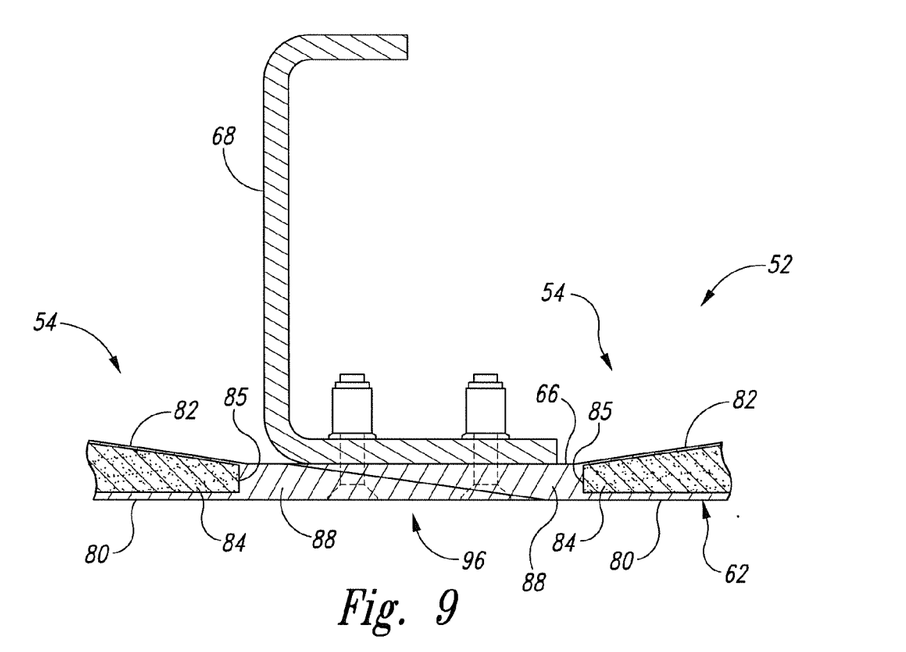
FIG. 9 is a fragmentary cross-sectional view of a portion of a fuselage according to the present disclosure, illustrating another example of a joint between two fuselage sections.
Figure 10:
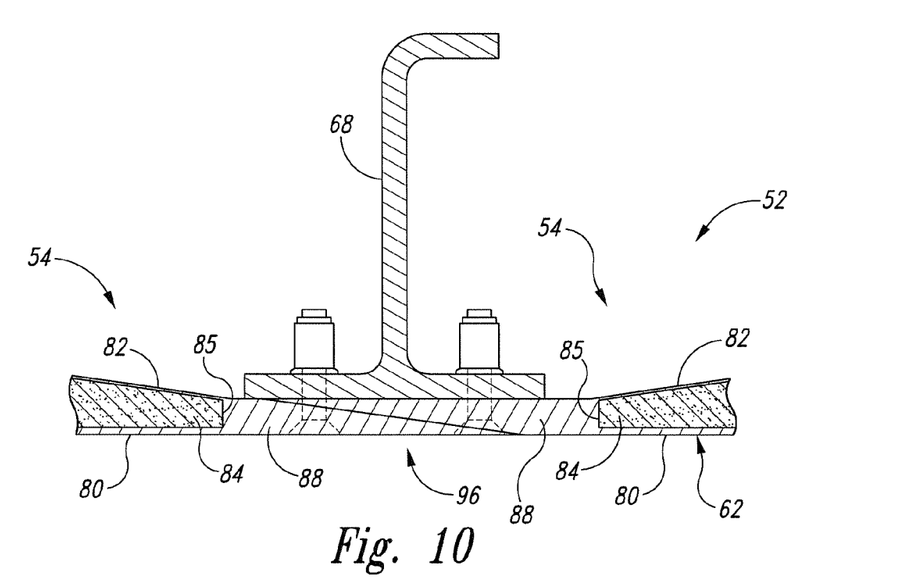
FIG. 10 is a fragmentary cross-sectional view of a portion of a fuselage according to the present disclosure, illustrating another example of a joint between two fuselage sections.

FIGS. 7-10 depict illustrative, non-exclusive examples of joints 96 between barrel sections 54 of a fuselage 52. As seen in these examples, a frame member 68 may extend circumferentially around the inner side 66 of the skin 62 at each joint 96 between adjacent barrel sections 54. In the examples of FIGS. 7-8, a splice plate 98 is utilized across the joint 96, whereas in the examples of FIGS. 9-10, no splice plate is used. In the examples of FIGS. 7-8, the edges of the barrel sections 54 are generally squared, and in the illustrated embodiments are spaced apart from each other, whereas in the examples of FIGS. 9-10, the edges of the barrel sections 54 are angled and overlap and engage each other. Other configurations also are within the scope of the present disclosure. In the illustrated examples of FIGS. 7-11, fasteners are depicted; however, it also is within the scope of the present disclosure that adjacent barrel sections 54 additionally or alternatively may be bonded and/or welded together.

Figure 11:
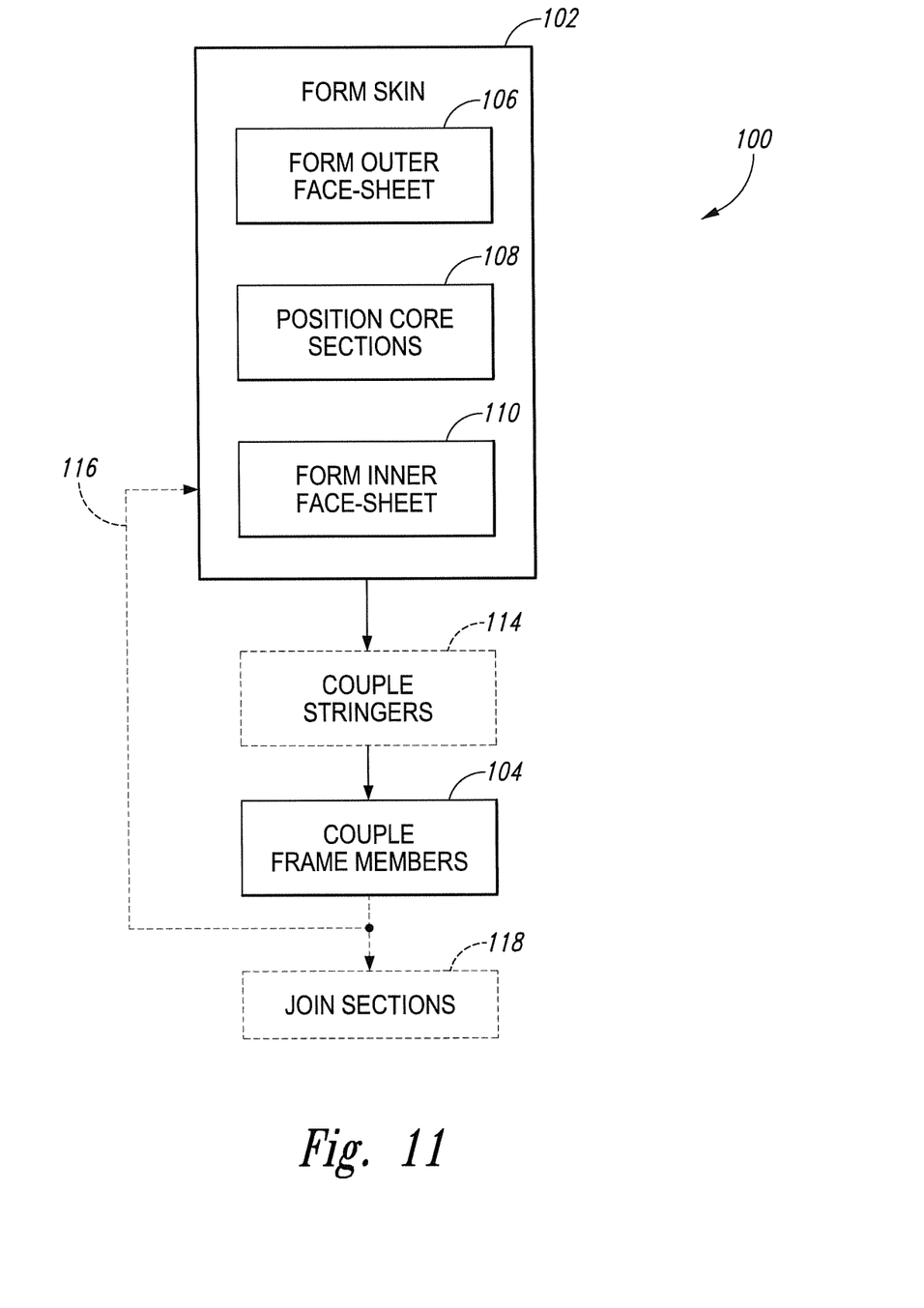
FIG. 11 is a flow-chart schematically representing methods according to the present disclosure.

FIG. 11 schematically provides a flowchart that represents illustrative, non-exclusive examples of methods according to the present disclosure. In FIG. 11, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 11 are not limiting and other methods and steps are within the scope of the present disclosure, including methods having greater than or fewer than the number of steps illustrated, as understood from the discussions herein.

FIG. 11 schematically represents illustrative, non-exclusive examples of methods 100 for constructing, or manufacturing, fuselages 52 according to the present disclosure. As illustrated in solid boxes in FIG. 11, methods 100 typically include forming the skin of the fuselage 52 or at least of a barrel section 54 or subsection 56 of a fuselage, as indicated at 102, and operatively coupling a plurality of frame members 68 circumferentially around the inner side 66 of the skin 62, as indicated at 104.

As schematically represented in FIG. 11, the forming 102 of methods 100 includes forming an outer face-sheet 80 to define an outer shape of the fuselage 52 and an outer side 64 of the skin 62, as indicated at 106, positioning core sections 84 on the inner side 93 of the outer face-sheet, as indicated at 108, and forming an inner face-sheet 82 over the core sections 84 to define an inner side 66 of the skin 62, as indicated at 110.

In some methods 100, the positioning 108 includes positioning the core sections 84 longitudinally spaced-apart along the inner side 93 of the outer face-sheet 80. In some methods 100, the forming 110 includes forming the inner face-sheet 82 over the core sections 84 to define cavities 86, within which the core sections 84 are positioned. In some methods 100, following the forming 110, each cavity 86 extends circumferentially at least partially around the fuselage 52, completely around the fuselage 52, or completely around the fuselage 52 other than within one or more window regions 74 and/or window and floor regions 76.

As schematically illustrated in a dashed box at 114, methods 100 also may include operatively coupling a plurality of stringers 70 longitudinally along the inner side 66 of the skin 62. However, as discussed herein, it is within the scope of the present disclosure that a fuselage 52 may not include any stringers 70.

In methods 100 in which at least the inner face-sheet 82 is constructed of fiber reinforced composite material, the coupling 104 may include forming the frame members 68 of fiber reinforced composite material to define a unitary structure with the inner face-sheet 82, and in methods in which the outer face-sheet 80 also is constructed of fiber reinforced composite material, the coupling 104 may include forming the frame members 68 of fiber reinforced composite material to define a unitary structure with the inner face-sheet 82 and the outer face-sheet 80. Similarly, in methods 100 in which optional stringers 70 are constructed of fiber reinforced composite material, the optional coupling 114 may include forming the stringers 70 of fiber reinforced composite material to define a unitary structure with the inner face-sheet 82, and in some methods 100, with the outer face-sheet 80, as well.

In some methods 100, the forming 106 and/or the forming 110 may include forming thickened, or reinforced, regions 92 longitudinally along and spaced circumferentially around the inner side 93 of the outer face-sheet 80 and/or around the outer side 95 of the inner face-sheet 82. In embodiments in which the outer face-sheet 80 is formed of fiber reinforced composite material, the thickened regions 92 may be formed with more plies of fiber reinforced composite material than adjacent regions of the outer face-sheet 80. Similarly, in embodiments in which the inner face-sheet 82 is formed of fiber reinforced composite material, the thickened regions 92 may be formed with more plies of fiber reinforced composite material than adjacent regions of the inner face-sheet 82.

As schematically and optionally indicated at 116 in FIG. 11, some methods 100 may include repeating the forming 102 and the coupling 104 (and in some methods 100, also the optional coupling 114) to construct more than one section and/or subsection of fuselage, and then as indicated optionally at 118, joining the sections and/or subsections together to form the fuselage 52.

In some methods 100, the forming 102 and the forming 106 may utilize an outer mold line (OML) tooling. Accordingly, the forming 102 may require only a single outer mold assembly corresponding to and configured to define the outer side 64 of the skin 62. As a result, the positioning 108 and the forming 110 may take place within the single mold assembly, resulting in a very efficient and easy construction method of the skin 62. Moreover, the coupling 104 is easily performed within the internal volume defined by the skin 62 after the skin 62 has been formed. However, utilization of inner mold line (IML) tooling also is within the scope of the present disclosure. Additionally or alternatively, some methods 100 may utilize autoclave curing and/or some methods 100 may utilize out-of-autoclave curing, for example in connection with the forming 102, the forming 104, the forming 106, and/or the forming 110. Illustrative, non-exclusive examples of inventive subject matter according to the present disclosure are described in the following enumerated paragraphs:

A. A fuselage, comprising:
a structural frame;
a skin operatively coupled to the structural frame, wherein the skin defines an outer shape of the fuselage, and wherein the skin includes:
an outer face-sheet defining an outer side of the skin;
an inner face-sheet defining an inner side of the skin; and
a plurality of core sections positioned between the outer face-sheet and the inner face-sheet.

A1. The fuselage of paragraph A, wherein the outer face-sheet is constructed of fiber reinforced composite material.

A2. The fuselage of any of paragraphs A-A1, wherein the inner face-sheet is constructed of fiber reinforced composite material.

A3. The fuselage of any of paragraphs A-A2, wherein the core sections are constructed of foam, and optionally rigid closed-cell foam.

A4. The fuselage of any of paragraphs A-A3, wherein the core sections are constructed of flame resistant material and/or of material that includes a flame retardant.

A5. The fuselage of any of paragraphs A-A4, wherein the core sections are constructed of a material that is configured to withstand a curing pressure without affecting the structural integrity of the core sections.

A6. The fuselage of any of paragraphs A-A5, wherein the structural frame is constructed of fiber reinforced composite material.

A7. The fuselage of any of paragraphs A-A6, wherein the structural frame includes a plurality of frame members operatively coupled to and extending circumferentially around the inner side of the skin, wherein the frame members are spaced longitudinally along the fuselage.

A7.1 The fuselage of paragraph A7, wherein the plurality of frame members are constructed of fiber reinforced composite material, optionally wherein the plurality of frame members are constructed as a unitary structure with the inner face-sheet, optionally wherein the plurality of frame members are constructed as a unitary structure with the outer face-sheet and the inner face-sheet, and further optionally wherein the plurality of frame members are operatively coupled to the skin with fasteners.

A7.2 The fuselage of any of paragraphs A7-A7.1, wherein at least a subset of the plurality of frame members includes outer chords that comprise failsafe chords and does not include mouseholes.

A8. The fuselage of any of paragraphs A-A7.2, further comprising:

fewer than 10, 9, 8, 7, 6, 5, 4, 3, 2, or 1 stringers that extend longitudinally along the inner side of the skin.

A8.1 The fuselage of paragraph A8, wherein the stringers include at least two stringers that bound a region of the fuselage defining one or more voids through the skin, optionally wherein the one or more voids are configured for one or more of a window, a door, a drain hole, a valve, and/or an antenna.

A8.2 The fuselage of any of paragraphs A8-A8.1, wherein the stringers consist of six stringers with two stringers on each lateral side of the fuselage defining a window region on each lateral side of the fuselage and with one stringer on each lateral side of the fuselage collectively defining a floor interface of the fuselage.

A8.3 The fuselage of any of paragraphs A8-A8.1, wherein the stringers consist of two stringers with one stringer on each lateral side of the fuselage collectively defining a floor interface of the fuselage.

A8.4 The fuselage of any of paragraphs A8-A8.3, wherein the stringers are constructed of fiber reinforced composite material, optionally wherein the stringers are constructed as a unitary structure with the inner face-sheet, optionally wherein the stringers are constructed as a unitary structure with outer face-sheet and the inner face-sheet, and further optionally wherein the stringers are operatively coupled to the skin with fasteners.

A8.5 The fuselage of any of paragraphs A8-A8.3, wherein the stringers are constructed of metal, optionally of aluminum or titanium alloy.

A8.6 The fuselage of any of paragraphs A8-A8.5, wherein the stringers are configured to conduct electricity longitudinally along the fuselage.

A9. The fuselage of any of paragraphs A-A8.6, wherein one or more circumferential spans of at least 10, 20, 30, 40, 50, 60, 70, 80, 90, or 95% of the fuselage is free of stringers that extend longitudinally along the inner side of the skin.

A10. The fuselage of any of paragraphs A-A9, wherein the outer face-sheet and the inner face-sheet collectively define a plurality of cavities spaced longitudinally along the fuselage, wherein a core section of the plurality of core sections is positioned within each cavity of the plurality of cavities, and optionally wherein a core section of the plurality of core sections predominantly fills each cavity of the plurality of cavities.

A10.1 The fuselage of paragraph A10, wherein each cavity of the plurality of cavities extends circumferentially and at least partially around the fuselage, optionally completely around the fuselage, and optionally completely around the fuselage other than within one or more regions that define one or more voids that extend through the skin.

A10.2 The fuselage of any of paragraphs A10-A10.1 when depending from paragraph A7, wherein each cavity of the plurality of cavities is positioned between adjacent frame members of the plurality of frame members.

A10.3 The fuselage of any of paragraphs A10-A10.2, wherein the outer face-sheet and the inner face-sheet are joined together between adjacent cavities of the plurality of cavities to define a partition between adjacent cavities that extends circumferentially around the fuselage, optionally completely around the fuselage, and optionally completely around the fuselage other than within one or more window and/or floor regions that extend longitudinally along the fuselage.

A10.3.1 The fuselage of paragraph A10.3 when depending from paragraph A7, wherein each frame member of the plurality of frame members is operatively coupled to the partition between adjacent cavities of the plurality of cavities.

A11. The fuselage of any of paragraphs A-A10.3.1, wherein the outer face-sheet includes a plurality of thickened, or reinforced, regions extending longitudinally along an inner side of the outer face-sheet, wherein the thickened regions are spaced circumferentially around the fuselage.

A11.1 The fuselage of paragraph A11, wherein each thickened region of the plurality of thickened regions includes 1-100, and optionally 2-3, more plies of fiber reinforced composite material than adjacent regions of the outer face-sheet, and optionally wherein each thickened region of the plurality of thickened regions consists of less than 10, and optionally less than 5, more plies of fiber reinforced composite material than adjacent regions of the outer face-sheet.

A11.2 The fuselage of any of paragraphs A11-A11.1, wherein the plurality of thickened regions includes at least and/or fewer than 10, 20, 30, 50, 75, or 100 thickened regions.

A11.3 The fuselage of any of paragraphs A11-A11.2, wherein at least a subset of the plurality of thickened regions are approximately evenly spaced at least every 30, 25, 20, 15, 10, or 5 degrees circumferentially around the fuselage.

A11.4 The fuselage of any of paragraphs A11-A11.3, wherein each thickened region of the plurality of thickened regions is less than about 20, 30, 40, 50, 60, 70, 80, 90, or 100 millimeters wide and/or is greater than about 20, 30, 40, 50, 60, 70, 80, 90, or 100 millimeters wide.

A11.5 The fuselage of any of paragraphs A11-A11.4, wherein each thickened region of the plurality of thickened regions is less than about 0.5, 1, 1.5, or 2 millimeters thicker than adjacent regions of the outer face-sheet and/or is greater than about 0.5, 1, 1.5, or 2 millimeters thicker than adjacent regions of the outer face-sheet.

A12. The fuselage of any of paragraphs A-A11.5, wherein the fuselage includes a plurality of barrel sections longitudinally and operatively coupled together.

A12.1 The fuselage of paragraph A12, wherein within each barrel section of the plurality of barrel sections, the outer face-sheet and the inner face-sheet are constructed as a unitary structure.

A12.2 The fuselage of paragraph A12 when depending from paragraph A6, wherein each frame member of the plurality of frame members extends circumferentially around the inner side of the skin at each seam between adjacent barrel sections of the plurality of barrel sections.

B. A fuselage, comprising a skin that is not uniform in thickness, wherein the skin defines an outer shape of the fuselage and has an inner side.

B1. The fuselage of paragraph B, wherein the inner side of the skin generally undulates longitudinally along the fuselage.

B1.1 The fuselage of paragraph B1, wherein the inner side of the skin regularly undulates longitudinally along the fuselage.

B1.2 The fuselage of any of paragraphs B1-B1.1, further comprising a plurality of frame members operatively coupled to and extending circumferentially around the inner side of the skin at regions of reduced thickness of the skin.

B2. The fuselage of paragraph B, wherein the inner side of the skin includes a plurality of convex regions extending radially inward of the fuselage and/or a plurality of hyperbolic surfaces that bulge radially inward of the fuselage.

B2.1 The fuselage of paragraph B2, wherein the plurality of convex regions and/or the plurality of hyperbolic surfaces are regularly spaced longitudinally along the fuselage.

B2.2 The fuselage of any of paragraphs B2-B2.1, further comprising a plurality of frame members operatively coupled to and extending circumferentially around the inner side of the skin between the convex regions and/or between the hyperbolic surfaces.

B2.2.1 The fuselage of paragraph B2.2, wherein at least a subset of the plurality of frame members includes outer chords that comprise failsafe chords and does not include mouseholes.

B2.3 The fuselage of any of paragraphs B2-B2.2.1, wherein the skin includes a plurality of core sections within the convex regions of the skin and/or adjacent to the hyperbolic surfaces.

B3. The fuselage of any of paragraphs B-B2.3, further including the subject matter of any of paragraphs A-A11.2.

B4. The fuselage of any of paragraphs A-B3, wherein the fuselage is configured to provide for an internal cabin volume, and wherein the fuselage has an outer cross-sectional profile that is smaller than an outer cross-sectional profile of a comparable prior art fuselage that is configured to provide the same internal cabin volume but that does not include a plurality of core sections and/or that includes greater than 10 stringers.

C. The use of the fuselage of any of paragraphs A-B4.

D. An aircraft, including the fuselage of any of paragraphs A-B4.

D1. The use of the aircraft of paragraph D.

E. A method of constructing a fuselage, comprising:
forming a skin, including:
forming an outer face-sheet to define an outer shape of the fuselage and an outer side of the skin;
positioning a plurality of core sections on an inner side of the outer face-sheet; and
forming an inner face-sheet over the plurality of core sections to define an inner side of the skin; and
operatively coupling a plurality of frame members to the inner side of the skin.

E1. The method of paragraph E, wherein the forming the outer face-sheet includes forming the outer face-sheet of fiber reinforced composite material.

E2. The method of any of paragraphs E-E1, wherein the forming the inner face-sheet includes forming the inner face-sheet of fiber reinforced composite material.

E3. The method of any of paragraphs E-E2, wherein the plurality of core sections are constructed of foam, and optionally rigid closed-cell foam.

E4. The method of any of paragraphs E-E3, wherein the plurality of core sections are constructed of flame resistant material and/or of material that includes a flame retardant.

E5. The method of any of paragraphs E-E4, wherein the plurality of core sections are constructed of a material that is configured to withstand a curing pressure without affecting the structural integrity of the core sections.

E6. The method of any of paragraphs E-E5, wherein the plurality of frame members are constructed of fiber reinforced composite material.

E7. The method of any of paragraphs E-E6, wherein the operatively coupling the plurality of frame members includes operatively coupling the plurality of frame members circumferentially around the inner side of the skin at spaced-apart intervals longitudinally along the fuselage.

E7.1 The method of paragraph E7, wherein the plurality of frame members are constructed of fiber reinforced composite material, optionally wherein the operatively coupling the plurality of frame members includes forming the plurality of frame members of fiber reinforced composite material to define a unitary structure with the inner face-sheet and optionally with the outer face-sheet, and optionally wherein the operatively coupling the plurality of frame members includes fastening the plurality of frame members to the skin with a plurality of fasteners.

E8. The method of any of paragraphs E-E7.1, further comprising:
operatively coupling a plurality of stringers longitudinally along the inner side of the skin, optionally wherein the plurality of stringers includes fewer than 10, 9, 8, 7, 6, 5, 4, 3, 2, or 1 stringers.

E8.1 The method of paragraph E8, wherein the plurality of stringers includes at least two stringers that bound a region of the fuselage defining one or more voids through the skin, optionally wherein the one or more voids are configured for one or more of a window, a door, a drain hole, a valve, and/or an antenna.

E8.2 The method of any of paragraphs E8-E8.1, wherein the plurality of stringers consists of six stringers, and wherein the operatively coupling the plurality of stringers includes operatively coupling two stringers on each side of the fuselage to define a window region on each side of the fuselage and operatively coupling one stringer on each lateral side of the fuselage to collectively define a floor interface of the fuselage.

E8.3 The method of any of paragraphs E8-E8.1, wherein the plurality of stringers consists of two stingers, and wherein the operatively coupling the plurality of stringers includes operatively coupling one stringer on each lateral side of the fuselage to collectively define a floor interface of the fuselage.

E8.4 The method of any of paragraph E8-E8.3, wherein the plurality of stringers are constructed of fiber reinforced composite material, and optionally wherein the operatively coupling the plurality of stringers includes forming the plurality of stringers of fiber reinforced composite material to define a unitary structure with the inner face-sheet and optionally with the outer face-sheet, and optionally wherein the operatively coupling the plurality of stringers includes fastening the plurality of stringers to the skin with a plurality of fasteners.

E8.5 The method of any of paragraphs E8-E8.3, wherein the plurality of stringers are constructed of metal, optionally of aluminum, and optionally wherein the operatively coupling the plurality of stringers includes fastening the stringers to the skin with a plurality of fasteners and/or welding the stringers to the skin.

E8.6 The method of any of paragraphs E8-E8.5, wherein the plurality of stringers are configured to conduct electricity longitudinally along the fuselage.

E9. The method of any of paragraphs E-E8.6, wherein the positioning the plurality of core sections includes positioning the plurality of core sections longitudinally spaced-apart along the inner side of the outer face-sheet, and wherein the forming the inner face-sheet includes forming the inner face-sheet over the plurality of core sections to define a plurality of cavities, within which the plurality of core sections are positioned.

E9.1 The method of paragraph E9, wherein following the forming the inner face-sheet, each cavity of the plurality of cavities extends circumferentially and at least partially around the fuselage, optionally completely around the fuselage, and optionally completely around the fuselage other than within one or more regions that define one or more voids in the skin, and optionally wherein the one or more voids are configured for one or more of a window, a door, a drain hole, a valve, and/or an antenna.

E9.2 The method of any of paragraphs E9-E9.1 when depending from paragraph E7, wherein following the operatively coupling the plurality of frame members, each cavity of the plurality of cavities is positioned between adjacent frame members of the plurality of frame members.

E9.3 The method of any of paragraphs E9-E9.2, wherein the forming the inner face-sheet includes joining the inner face-sheet to the outer face-sheet at spaced-apart intervals longitudinally along the fuselage and between the adjacent cavities of the plurality of cavities to define partitions between adjacent cavities of the plurality of cavities.

E10. The method of any of paragraphs E-E9.3, wherein the forming the outer face-sheet includes forming thickened, or reinforced, regions longitudinally along and spaced circumferentially around the inner side of the outer face-sheet, and/or wherein the forming the inner face-sheet includes forming thickened regions longitudinally along and spaced circumferentially around the outer side of the inner face-sheet.

E10.1 The method of paragraph E10, wherein each thickened region of the plurality of thickened regions includes 1-100, and optionally 2-3, more plies of fiber reinforced composite material than adjacent regions of the outer face-sheet or the inner face-sheet, and optionally wherein each thickened region consists of less than 10, and optionally less than 5, more plies of fiber reinforced composite material than adjacent regions of the outer face-sheet or the inner face-sheet.

E10.2 The method of any of paragraphs E10-E10.1, wherein the plurality of thickened regions includes at least 10, 20, 30, 50, 75, or 100 thickened regions.

E10.3 The method of any of paragraphs E10-E10.2, wherein at least a subset of the plurality of thickened regions includes thickened regions that are approximately evenly spaced at least every 30, 25, 20, 15, 10, or 5 degrees circumferentially around the fuselage.

E10.4 The method of any of paragraphs E10-E10.3, wherein each thickened region of the plurality of thickened regions is less than about 20, 30, 40, 50, 60, 70, 80, 90, or 100 millimeters wide and/or is greater than about 20, 30, 40, 50, 60, 70, 80, 90, or 100 millimeters wide.

E10.5 The method of any of paragraphs E10-E10.4, wherein each thickened region of the plurality of thickened regions is less than about 0.5, 1, 1.5, or 2 millimeters thicker than adjacent regions of the outer face-sheet or the inner face-sheet and/or is greater than about 0.5, 1, 1.5, or 2 millimeters thicker than adjacent regions of the outer face-sheet or the inner face-sheet.

E11. The method of any of paragraphs E-E10.5, further comprising:
repeating the method to define sections or subsections of the fuselage; and
joining the sections together.

E12. The method of any of paragraphs E-E11 to produce the fuselage of any of paragraphs A-B3.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A fuselage, comprising:
a skin defining an outer shape of the fuselage and including:
an outer face-sheet defining an outer side of the skin;
an inner face-sheet defining an inner side of the skin; and
a plurality of core sections positioned between the outer face-sheet and the inner face-sheet; and
a structural frame operatively coupled to the inner side of the skin, wherein the structural frame includes a plurality of frame members operatively coupled to and extending circumferentially around the inner side of the skin, wherein the frame members are spaced longitudinally along the fuselage;
wherein the outer face-sheet and the inner face-sheet are constructed of fiber reinforced composite material as a unitary structure and collectively define a plurality of cavities spaced longitudinally along the fuselage, wherein each cavity of the plurality of cavities extends circumferentially and at least partially around the fuselage and is positioned between adjacent frame members of the plurality of frame members, wherein a core section of the plurality of core sections is positioned within each cavity of the plurality of cavities, and wherein the plurality of core sections and the plurality of cavities are elongate in a circumferential direction around the fuselage.

2. The fuselage of claim 1, wherein each cavity of the plurality of cavities extends completely around the fuselage other than within one or more regions that define one or more voids that extend through the skin.

3. The fuselage of claim 2, wherein the one or more voids are configured for one or more of a window, a door, a drain hole, a valve, or an antenna.

4. The fuselage of claim 1, wherein the outer face-sheet and the inner face-sheet are joined together between adjacent cavities of the plurality of cavities to define a partition between adjacent cavities that extends circumferentially around the fuselage.

5. The fuselage of claim 4, wherein each frame member of the plurality of frame members is operatively coupled to the partition between adjacent cavities of the plurality of cavities.

6. The fuselage of claim 1, wherein the plurality of core sections are constructed of rigid closed-cell foam.

7. The fuselage of claim 1, further comprising:
a plurality of stringers that extend longitudinally along the inner side of the skin, wherein the plurality of stringers consists of fewer than 10 stringers.

8. The fuselage of claim 7, wherein the stringers consist of six stringers with two stringers on each lateral side of the fuselage defining a window region on each lateral side of the fuselage and with one stringer on each lateral side of the fuselage collectively defining a floor interface of the fuselage.

9. The fuselage of claim 7, wherein the stringers consist of two stringers with one stringer on each lateral side of the fuselage collectively defining a floor interface of the fuselage.

10. The fuselage of claim 1, wherein at least a subset of the plurality of frame members includes outer chords that comprise failsafe chords and does not include mouseholes.

11. The fuselage of claim 1, wherein the outer face-sheet includes a plurality of thickened regions extending longitudinally along an inner side of the outer face-sheet, wherein the thickened regions are spaced circumferentially around the fuselage.

12. The fuselage of claim 1, wherein the fuselage includes a plurality of barrel sections longitudinally and operatively coupled together.

13. A fuselage, comprising:
a skin defining an outer shape of the fuselage and including:
  an outer face-sheet defining an outer side of the skin;
  an inner face-sheet defining an inner side of the skin; and
  a plurality of core sections positioned between the outer face-sheet and the inner face-sheet;
a structural frame operatively coupled to the inner side of the skin, and
stringers that extend longitudinally along the inner side of the skin, wherein the stringers consist of six stringers with two stringers on each lateral side of the fuselage defining a window region on each lateral side of the fuselage and with one stringer on each lateral side of the fuselage collectively defining a floor interface of the fuselage.

14. The fuselage of claim 13, wherein the fuselage is configured to provide for an internal cabin volume, and wherein the fuselage has an outer cross-sectional profile that is smaller than an outer cross-sectional profile of a comparable prior art fuselage that is configured to provide the same internal cabin volume but that includes greater than 10 stringers.

15. A method of constructing a fuselage, comprising:
forming a skin, including:
  forming an outer face-sheet to define an outer shape of the fuselage and an outer side of the skin;
  positioning a plurality of core sections on an inner side of the outer face-sheet; and
  forming an inner face-sheet over the plurality of core sections to define an inner side of the skin; and
operatively coupling a plurality of frame members to the inner side of the skin at spaced apart intervals longitudinally along the fuselage;
wherein the positioning the plurality of core sections includes positioning the plurality of core sections longitudinally spaced-apart along the inner side of the outer face-sheet, and wherein the forming the inner face-sheet includes forming the inner face-sheet over the plurality of core sections to define a plurality of cavities, within which the plurality of core sections are positioned; and
wherein following the forming and the operatively coupling, each cavity of the plurality of cavities is positioned between adjacent frame members of the plurality of frame members, and the plurality of core sections and the plurality of cavities are elongate in a circumferential direction around the fuselage.

16. A fuselage, comprising:
a skin defining an outer shape of the fuselage and including:
  an outer face-sheet defining an outer side of the skin;
  an inner face-sheet defining an inner side of the skin; and
  a plurality of core sections positioned between the outer face-sheet and the inner face-sheet;
a structural frame operatively coupled to the inner side of the skin, wherein the structural frame includes a plurality of frame members operatively coupled to and extending circumferentially around the inner side of the skin, wherein the frame members are spaced longitudinally along the fuselage; and
stringers that extend longitudinally along the inner side of the skin, wherein within a section of the fuselage the stringers consist of six stringers with two stringers on each lateral side of the fuselage defining a window region on each lateral side of the fuselage and with one stringer on each lateral side of the fuselage collectively defining a floor interface of the fuselage;
wherein the outer face-sheet and the inner face-sheet collectively define a plurality of cavities spaced longitudinally along the fuselage, wherein a core section of the plurality of core sections is positioned within each cavity of the plurality of cavities.

* * * * *